United States Patent [19]
Penley

[11] 3,807,506
[45] Apr. 30, 1974

[54] CULTIVATING ASSEMBLY

[76] Inventor: Wiley F. Penley, Athens, Ala. 35611

[22] Filed: Nov. 22, 1972

[21] Appl. No.: 308,651

[52] U.S. Cl.................. 172/42, 172/63, 172/71
[51] Int. Cl..................... A01b 33/02, A01b 33/16
[58] Field of Search............ 172/42, 43, 63, 68, 71, 172/72, 123, 182

[56] References Cited
UNITED STATES PATENTS

| 895,417 | 8/1908 | Boyer..................... | 172/182 |
| 944,215 | 12/1909 | Sanborn................. | 172/182 |
| 1,525,262 | 2/1925 | Austin..................... | 172/63 X |
| 1,661,122 | 2/1928 | King........................ | 172/42 X |
| 1,909,307 | 5/1933 | Nowell.................... | 172/68 |
| 3,437,061 | 4/1969 | Wells...................... | 172/123 X |

FOREIGN PATENTS OR APPLICATIONS

| 1,228,964 | 9/1960 | France.................... | 172/42 |
| 1,046 | 1/1882 | Italy........................ | 172/71 |
| 130,559 | 8/1949 | Sweden.................. | 172/182 |
| 239,133 | 12/1945 | Switzerland............ | 172/42 |

OTHER PUBLICATIONS

Farm Implement News, Vol. 76, No. 3, Feb. 10, 1955, "Springtil" and "Champ" advertising brochure.
LeClaire Manufacturing Co. Adv. Brochure, "The Model E Handy Dandy Garden Cultivator," received Aug., 1954.

Primary Examiner—Robert E. Pulfrey
Assistant Examiner—Paul T. Sewell

[57] ABSTRACT

A cultivating assembly for a rotary tiller consisting of a supporting frame adapted to be mounted on the main frame of the tiller and extending horizontally to each side of the tiller behind the tilling rotor and including one or more cultivating elements adjustably mounted to enable an element to be adjusted laterally, horizontally and angularly.

3 Claims, 4 Drawing Figures

PATENTED APR 30 1974 3,807,506

CULTIVATING ASSEMBLY

BACKGROUND OF THE INVENTION

This invention relates to rotary tillers commonly employed in cultivating gardens and with respect to which the operator walks behind the tiller and guides and controls the tiller by means of two rearwardly extended handles.

GENERAL DESCRIPTION OF THE PRIOR ART

Rotary tillers of the category described are in widespread use and in such device is illustrated in Kamlukin U.S. Pat. No. 2,903,077. As shown therein, a gasoline engine is mounted on a central frame and the engine is connected to a cultivating rotor journal and to the frame with the rotor axis horizontal and transverse to the frame. Typically the rotor includes a plurality of hoe-like tines. A pair of wheels mounted rearward of the cultivating rotor basically support the tiller and a pair of upwardly and rearwardly extended handles enable an operator to control the operation of the cultivating rotor and guide the tiller. The depth of cultivation is generally controlled by depth adjustment of a drag bar mounted at the rear of the tiller.

SUMMARY OF THE INVENTION

It is the object and purpose of the present invention to improve rotary tillers such as described above and to provide in a single apparatus a device which not only digs up the soil but provides effective means for performing functions necessary to complete soil preparation for planting.

Accordingly, the present invention contemplates an assembly in which an implement holding frame is added to the conventional tiller, extending outward on each side of the tiller and behind the tilling rotor. On it are mounted one or more cultivating elements such as a disc or plow and these are adjustably mounted whereby they may be adjustably positioned horizontally, vertically and angularly about a generally vertical axis.

DESCRIPTION OF THE PREFERRED EMBODIMENT

Figure 3:
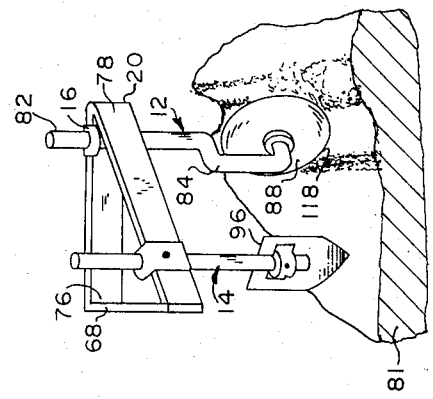
FIGS. 3 and 4 are right and left pictorial partial views of cultivator assemblies and showing their relationship with portions of the tilling rotor behind which each is positioned.

Referring to the drawings, cultivator assembly 10 includes cooperating disc and plow assemblies 12 and 14 respectively, (FIG. 1) which are adjustably and interchangeably attached by similar clamps 16 to a pair of triangular shaped horizontal tool support-frames 18 and 20, mounted on opposite sides of rotary type garden tiller 22.

Rotary tiller 22 is of a conventional construction, being illustrative of a variety of such devices available today, which are of a size particularly suited to gardening purposes.

Tiller 22 is powered by gasoline engine 24, having integral gas tank 26, and is mounted near forward end 28 of longitudinal box frame 30.

Transverse tilling rotor 32, disposed below engine 24 and also mounted to frame 30, is equipped with soil engaging tines 34, being driven by engine 24, at a greatly reduced speed, through a conventional reversible, belt coupled, transmission, not shown.

A pair of rearwardly disposed handles 36 and 38 are inclined upward at an angle suitable for maneuvering the tiller 22, being secured at lower ends to frame 30, and which terminate in hand grips 40 and 42 at free ends 44 and 46, respectively.

Motion control levers 48 and 50 are pivotally attached to handles 38 and 40 in gripping association with grips 40 and 42, respectively. Levers 48 and 50 are connected through cables 52 to control the belt drive transmission in a well known manner, and cause rotor 32 to reverse its direction with respect to the rotation of gasoline engine 24. Thus tiller 22 is selectively propelled in a forward or reverse direction as desired. Engine speed is separately controlled through control line 54 connected to throttle lever 56 of control panel 58, attached at a point adjacent upper end 46 of handle 36.

Tool supporting frames 18 and 20 (FIG. 2) are typically fabricated from a length of steel strap, having a rectangular cross section, and are formed into a triangular configuration. The free ends 60 and 62 of the strap are preferably joined by weld 64 in order to provide a more stable structure.

Frames 18 and 20 are provided with a series of equally spaced holes 66 formed in inwardly disposed legs 68, whereby they are detachably secured, by bolts 70, to opposite sides 72 and 74, respectively, of tiller 22, through mating holes formed in box frame 30.

This mounting arrangement provides, on either side 72 and 74, of tiller 22, a laterally disposed support member 76 which is adapted to support a disc or plow assembly 12 and 14, respectively at a desired lateral position immediately rearward of rotor 32. Additionally, inclined support member 78 of each of frames 18 and 20, is adapted to mount a second assembly 12 and 14 in a position behind the first, so that both assemblies 80 cooperate to progressively move soil 81 inward of or outward from the center of rotor 32, in a manner to be further described.

Disc assembly 12 includes elongated vertical support rod or tube (FIG. 4) 82, preferrably circular in cross section and having the lower end configured into U-shaped element 84. The lower transverse arm 86 of element 84 is adapted to rotably support conventional cupped disc 88, such that cutting edge 90 is in alignment with the longitudinal axis of vertical support 82.

Plow assembly 14 (FIG. 4) includes a vertical support rod or tube 92, similar to vertical support 82 described above, which has lower and portion 94 adapted to mount a conventional plow point 96.

Disc and plow assemblies 12 and 14, being further referred to as attachments 80, are adjustably attached to frames 18 and 20 by clevis type clamps 16 (FIG. 2), having parallel arms 98 spaced to straddle the width dimension of support members 76 and 78 of frames 18 and 20.

Figure 1:
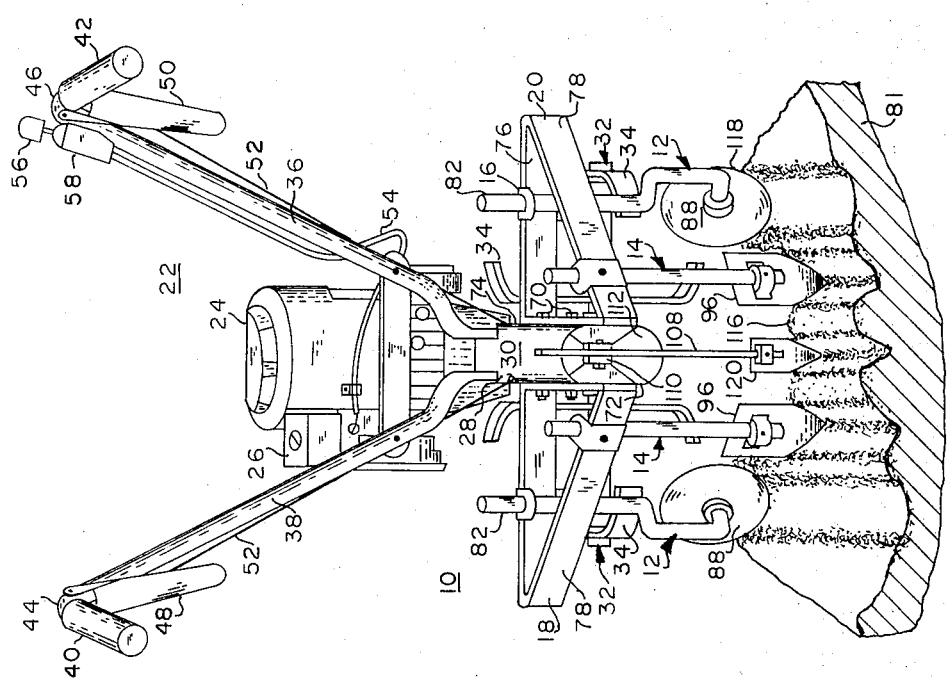
FIG. 1 is a cover-all pictorial view, from the rear, of a tilling device embodying the invention.
Figures 2, 4:
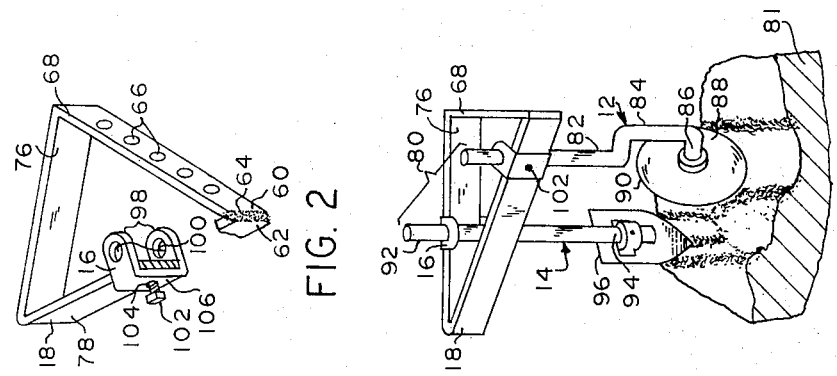
FIG. 2 is a pictorial view of a cultivator frame adapted to attached to the central body portion of the rotary tiller.

Aligned holes 100, formed in arms 98 of clamps 16, are adapted to freely accept vertical supports 82 and 92 of disc and plow assemblies 12 and 14, respectively, when assembled to frames 18 and 20. A clamping action is applied to vertical supports 82 and 92 by the threaded screw 102, threadably engaged through like threaded aperture 104, centrally formed in connecting arm 106 of clamps 16. When this screw 102 is tightened against one side of frame members 76 and 78, vertical supports 82 and 92 are drawn into firm contact with the opposing side of same (FIGS. 1, 3 and 4).

From the above description, it is obvious that, when clamps 16 are loosened, the plow and disc assemblies 12 and 14, may be vertically positioned to disengage them from the soil 81 or to penetrate the soil 81 to any desired depth. Further, attachments — may be rotated so that disc 88 and plow point 96 engage the soil 81 at any desired angular position.

As previously mentioned, attachments 80 may be interchanged and firmly clamped at any desired lateral position along support members 76 and 78 of frames 18 and 20 to perform a variety of tilling or plowing operations.

It is readily seen that if attachments 80 are disengaged from the soil 81, then rotary tiller 22 may be utilized in a normal manner, wherein an operator applies pressure upon, or lifts handles 36 and 38 to control the forward movement and depth of penetration achieved by tilling rotor 22. This control of rotor 32 is enabled by conventional drag bar 108, adjustably attached by yoke 110 to rear end 112 of box frame 30, which applies a greater or lesser braking force in accordance with the depth to which it penetrates the soil 81.

Tiller 22 includes a pair of detachable wheels, not shown, typically mounted on opposite sides 72 and 74 of frame 30, being disposed immediately forward of drag bar 108. Thus when drag bar 108 is disengaged, the wheels may be used to support rear end 112 of tiller 22 to enhance maneuverability and enable the tiller 22 to be self-propelled from one plot of ground to another.

FIG. 1 illustrates how the attachments 80 may be configured to produce an elevated row or mound 116 suitable for planting certain seedlings. Each of discs 88 is situated immediately inward of outer tines 34 of rotor 32, having the concave side 118 forward, and turned inward a few degrees toward the center of rotor 32. Disc 88 is then lowered to engage soil 81 at a depth essentially equal to the penetration of rotor 32.

Each of plow assemblies 14 is attached by clamps 16 at a point along inclined member 78 of each of frames 18 and 20 such that plow points 96 are positioned intermediate disc 88 and drag bar 108. The forward facing surfaces of plow points 96 are turned inward a few degrees toward center of rotor 32, being vertically positioned to controllably engage the soil 81 in accordance with the position of handles 36 and 38, as will be described.

To operate cultivator 10, once engine 24 is started, rotor 32 is set in a clockwise motion, as viewed from right side 74 of tiller 22 (FIG. 1), by squeezing clutch activating lever 50 of handle 36.

Initially, tiller 22 is rocked from side to side, as is normal, in order to engage rotor 32 a suitable depth into soil 81 while simultaneously allowing rotor 32 to propel it progressively forward.

Forward movement is controlled by applying more or less downward pressure to handles 36 and 38 to further engage or disengage plow points 96, which act a braking force.

Once attachments 80 are fully engaged with loose soil 81 being processed by rotor 32, and tiller 22 is moving forward, then discs 88 continuously move this soil 81 inward and forward of plow points 96 on either side of tiller.

Plow points 96, in turn, shift the soil 81 accumulated forward of points 96 by discs 88, plus an amount picked up by the points 96 themselves, toward the center of tiller 22, to form an elevated mound or row 116. As a further aid in preparation for planting, a smaller plow point 120 attached near the lower end of conventional drag bar 108 is vertically positioned to open a continuous furrow in row 116.

Once rows 116 have been properly seeded, the furrows may be covered by using a single disc 88 on either side of the cultivator 10. One typical configuration for accomplishing this operation is illustrated in FIG. 3 wherein both attachments 80 on the left side 72 have been disengaged and only one disc 88 on the right side 74 of tiller 22 is utilized.

Disc assembly 88 is clamped to forward support member 76, being laterally positioned such that disc 88 is outward of right extremity of rotor 32, and has convex surface 118 facing forward and turned a few degrees to the right, as viewed in FIG. 3.

As the tiller 22 is guided in a forward path to the left of row 116, disc 88 is maintained in a suitable engagement with soil 81 to perform the covering operation. Since no braking action is applied, the speed of engine 24 would typically be adjusted so as to provide a comfortable walking pace.

Additionally, a single disc assembly 12 may be used to open a furrow suitable for planting, while the tiller 22 is being operated in the normal manner. Typically, disc 88 would be oriented, as shown in FIG. 3, but would be situated at an intermediate point of support bar 76 and vertically positioned to open a furrow of the desired depth in soil 81 being processed by rotor 32. Again, when the rows thus formed are planted, disc 88 may be used, as heretofore described, to perform the covering operation.

It may be readily observed that the configuration shown in FIG. 1 can also be used in cultivating growing plants by shifting or turning the soil 81, during dry periods, to enhance the moisturizing process.

When it is desired to perform the reverse movement of soil 81, wherein soil 81 from the center of planted rows, not shown, is moved outward toward the plants, also not shown, a configuration such as that shown in FIG. 4 is used. Here the relative positions of plow and disc assemblies 12 and 14, respectively, are the reverse to that shown in FIG. 1, and the forward surfaces of the plow 96 and disc 88 are oriented a few degrees outward from the center of rotor 32.

Accordingly, loose soil 81 is turned in the opposite direction behind rotor 32. Further cultivation is provided by drag bar 108 which, as previously mentioned, is also provided with a small plow point 120. It is obvious from the above description that the cultivator 10 may be configured to perform many operations not heretofore possible with a rotary tiller 22, as normally equipped.

What is claimed is:

1. A cultivator comprising:

a rotary tiller of the type having a central frame supporting a motor driven, front mounted, tilling rotor having a plurality of hoe-like tines and including a pair of rear mounted supporting wheels and a pair of rearwardly extending handles;

a generally triangular implement frame attached to each side of said central frame and each of said implement frames extending horizontally outward from said central frame and behind said tilling rotor;

at least one cultivating unit attached to each implement frame comprising:

a vertical elongated support, a cultivating element on one end region of a said elongated support, and mounting means attached to the opposite end region of a said elongated support for adjustably mounting and positioning said elongated support of said implement frame, including means for adjustably mounting said elongated support as to height, laterial position and angular position about the axis of said elongated support.

2. A cultivator assembly as set forth in claim 1 wherein said cultivating unit is a disc.

3. A cultivator as set forth in claim 1 wherein a pair of said cultivating units is attached to each of said implement frames and wherein each of one pair of said cultivating units is a plow on a said elongated support in turn mounted on a said front frame member of a said implement frame and the other of each pair of cultivating units is a disc mounted on a said elongated frame in turn mounted on a said rear frame member of a said implement frame.

* * * * *